United States Patent
Lizotte et al.

(10) Patent No.: US 7,321,114 B2
(45) Date of Patent: Jan. 22, 2008

(54) APPARATUS AND METHOD FOR BEAM DRIFT COMPENSATION

(75) Inventors: Todd E. Lizotte, Manchester, NH (US); Orest P. Ohar, Hooksett, NH (US)

(73) Assignee: Hitachi Via Mechanics, Ltd., Ebina (JP)

( * ) Notice: Subject to any disclaimer, the term of this patent is extended or adjusted under 35 U.S.C. 154(b) by 126 days.

(21) Appl. No.: 11/077,023

(22) Filed: Mar. 10, 2005

(65) Prior Publication Data

US 2006/0202115 A1 Sep. 14, 2006

(51) Int. Cl.
*H01J 3/14* (2006.01)
(52) U.S. Cl. ............... 250/234; 250/216; 372/107
(58) Field of Classification Search ...... 250/234–236, 250/216, 205; 372/107, 108
See application file for complete search history.

(56) References Cited

U.S. PATENT DOCUMENTS

| 5,315,111 | A | | 5/1994 | Burns et al. | 250/235 |
| 5,489,986 | A | * | 2/1996 | Magome et al. | 356/401 |
| 5,923,418 | A | * | 7/1999 | Clark et al. | 356/153 |
| 6,002,706 | A | * | 12/1999 | Staver et al. | 372/108 |
| 6,669,803 | B1 | * | 12/2003 | Kathman et al. | 156/250 |
| 2003/0164996 | A1 | * | 9/2003 | Popovich et al. | 359/22 |
| 2006/0092406 | A1 | * | 5/2006 | Lizotte | 356/153 |

OTHER PUBLICATIONS

Pacific Silicon Sensor, Inc., DL-400-7-KER 4..1 pin Position Sensing Photodiodes brochure, date unknown.
Pacific Silicon Sensor, Inc., DL100-7PCBA3 brochure, date unknown.
Hamamatsu Photonics K.K., PSD (Position Sensitive Detector), brochure No. KSPD0001E01 (Jul. 2003).
Hamamatsu Photonics K.K., Profile Sensor S9132, brochure No. KSP-0002 (Feb. 25, 2003).
Hamamatsu Photonics K.K., One-Dimensional PSD S3979, S3931, S3932, S1352, S3270, brochure No. KSPD1002E03 (Aug. 2004).

* cited by examiner

*Primary Examiner*—Kevin Pyo
(74) *Attorney, Agent, or Firm*—McLane, Graf, Raulerson & Middleton, PA; Scott C. Rand

(57) ABSTRACT

An apparatus and method for maintaining a desired position of a collimated light beam are provided. An optical system includes one or more passive optical elements movably positioned in the beam path. Beam position is responsive to movement of at least one of the passive optical elements. The actual position of the beam is detected and compared with the desired beam position. An error signal is generated and the beam path is altered responsive to movement of one or more of the passive optical elements. In further aspects, beam shaping optics, such diffractive optics, are provided to shape the sensed beam portion. In still other aspects, thermal conditions of the laser may be monitored and a thermal map is provided to automatically compensate for estimated beam drift due to thermal conditions.

23 Claims, 15 Drawing Sheets

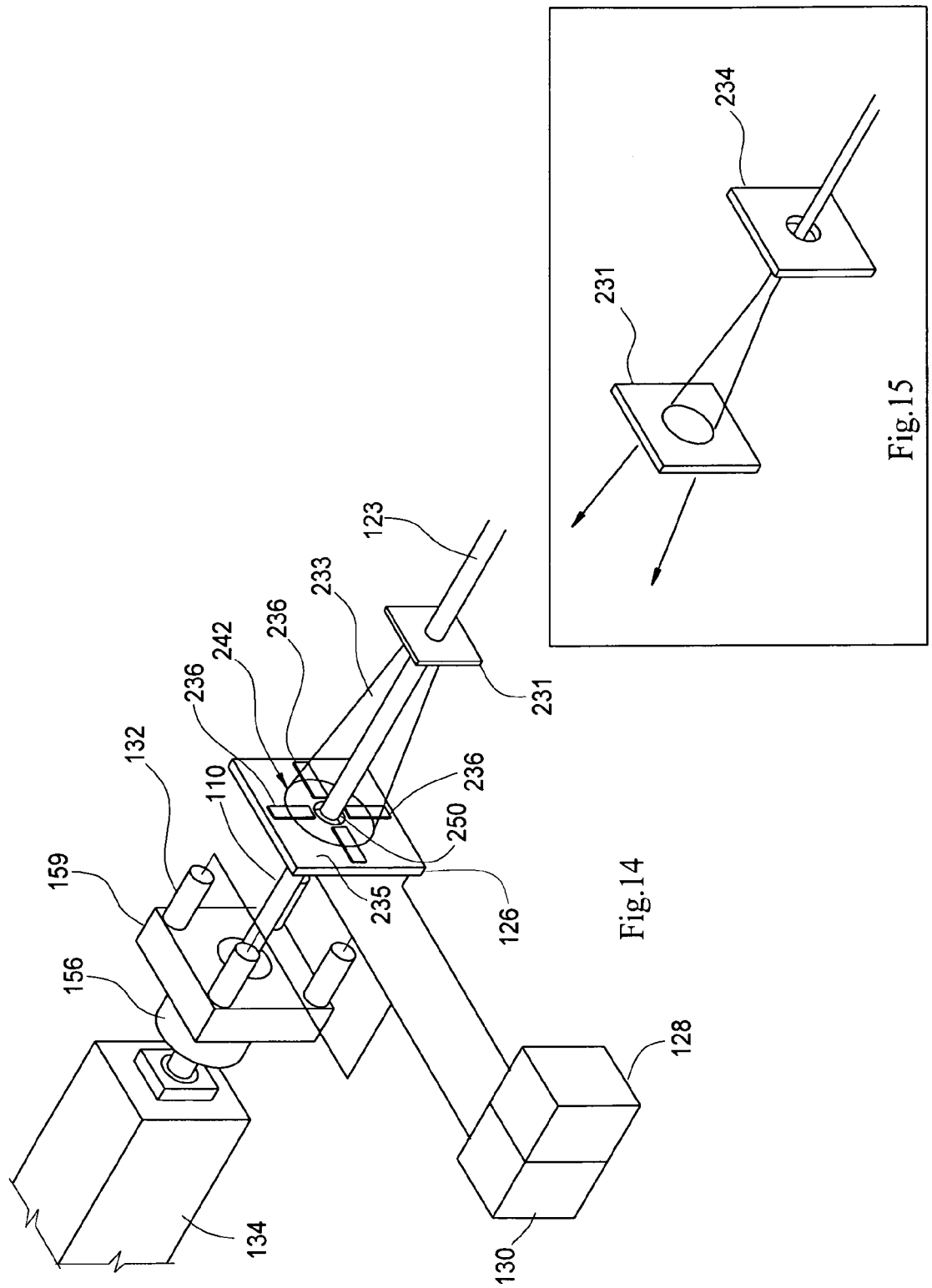

APPARATUS AND METHOD FOR BEAM DRIFT COMPENSATION

BACKGROUND OF THE INVENTION

The present invention relates an optical beam drift compensation apparatus and method for monitoring a beam position and optically compensating for changes in position of the beam so as to direct the laser beam along a desired optical path. The invention finds particular utility in connection with all manner of laser beam applications wherein a laser beam is delivered to a workpiece or other target to be processed, including industrial and other laser applications. Exemplary applications include laser machining, drilling, ablation, and so forth, illumination, photobonding or photocuring applications, and other laser processing applications. It will be recognized that the present invention may be employed with all manner of optical systems wherein it is necessary or desired to deliver a laser or other collimated ray path to a precise target location or otherwise maintain a precise propagation path.

The direction or position of a laser beam tends to drift over time for a number of reasons, including thermal effects within the laser source, fluctuations in air density, vibration or movement of the surface or platform carrying the laser source, movement, vibration, or thermal effects on the optical components in the optical train. Laser beam drift compensation systems are known which employ a beam splitter to direct a portion of the beam to a photosensitive position sensor, such as quadrant detector. Any difference between the detected position and the anticipated or desired position are corrected using complex and expensive electro-optic devices. See, for example, U.S. Pat. No. 5,315,111. Passive techniques for stabilizing the beam position and direction typically rely on vibration isolation and the use of components which minimize thermal effects. Such techniques, however, are very expensive and are of limited effectiveness. See, for example, U.S. Pat. Nos. 5,315,111 and 5,923,418. Accordingly, the present invention contemplates a new and improved apparatus and method for compensating for beam drift compensation employing inexpensive, passive optical devices.

BRIEF DESCRIPTION OF THE DRAWINGS

The accompanying drawings, which are incorporated in and constitute a part of the specification, illustrate embodiments of the invention and together with the description of the invention herein, serve to explain the principles of the invention. Like reference numerals are used to refer to the same or analogous components throughout the several views. It will be recognized that the depicted elements are not necessarily drawn to scale.

FIGS. 14-18 depict additional embodiments in which a diffractive optical element is employed to reflect a shaped beam portion to a position sensor coaxial with the incident beam.

DETAILED DESCRIPTION OF THE PREFERRED EMBODIMENTS

Figure 1:
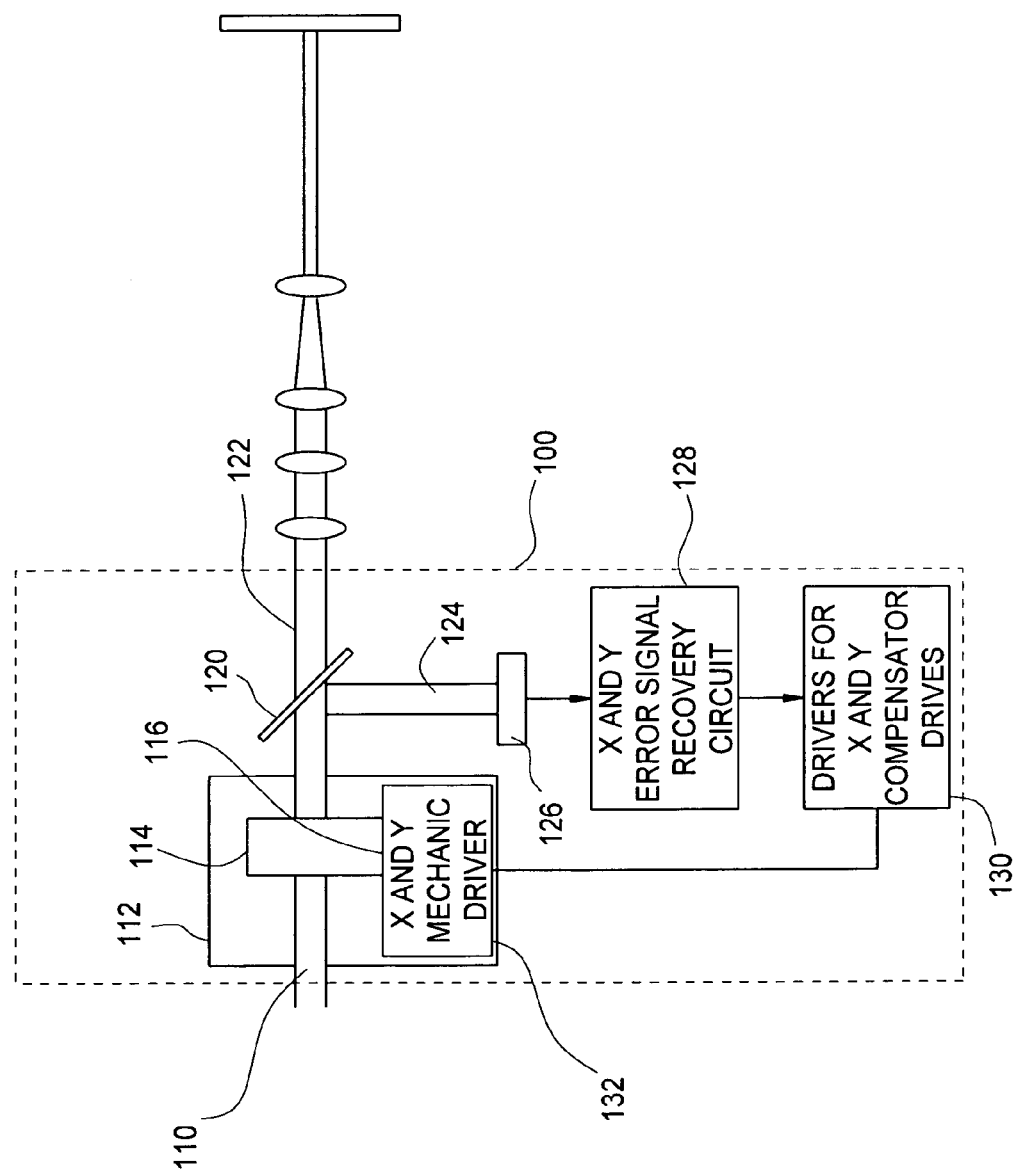
FIG. 1 is a schematic illustration of a beam shift compensator device in accordance with aspects of the present invention.

Referring now to FIG. 1, there is shown a first embodiment of a beam stabilizing system 100 used to monitor and adjust the position of a laser beam 110. The depicted embodiment includes a beam drift compensator 112 employing prismatic wedges 114 and 116 and a beam splitter 120. The beam splitter 120 may be e.g., a folding beam splitter mirror, a diffractive optical sampler, etc., which transmits a portion 122 of the incident beam 110 and reflects a portion 124 to position-sensing photosensor or photo imager 126.

It will be recognized that, as an alternative to the photosensitive detectors described herein, a position-sensing thermal device for sensing the heating effect of the incident beam, such as a thermal detector, pyroelectric device, thermopile sensors, or the like, may be employed in place thereof. Exemplary beam-compensating systems employing thermal sensors are described in detail below.

Although the laser source emission will be primarily referred to as a "beam" and it will be recognized that the beam need not be a continuous beam, but may be a pulsed beam. Furthermore, it will be recognized that additional means for delivering or steering the laser beam to along a desired optical path may be used, including but not limited to, such as prisms, mirrors, lenses, optical fibers, optical crystals, and the like, and arrangements and combinations thereof.

The reflected beam 124 is directed to a photodetector 126 which may be, for example, a charge-coupled device (CCD)

array, photo diode array, complimentary metal oxide semiconductor (CMOS) digital detector arrays, or the like. Preferably, only a small portion of the beam is reflected.

It will be recognized that alternative arrangements of the optical elements in the optical train may be employed. For example, in alternative embodiments (not shown) the photosensor may be positioned such that beam splitter transmits a portion of the incident beam for position detection and compensation and the remainder of the beam is reflected, e.g., to a work piece or other target. In said alternative embodiments, it is preferable that only a small portion of the beam is transmitted through the beam splitter to the photosensor, with the majority of the incident beam being reflected. In still further embodiments, it will be recognized that the beam drift compensating apparatus may be positioned at any desired position in the optical train.

The output of the photosensor is passed to x and y position-detection circuitry 128, wherein x and y refer to mutually orthogonal directions with respect to the direction of travel of the beam, referred to herein as the z direction. The circuitry 128 determines the x and y directional components of the deviation of the actual path of the beam 122 with respect to a desired position of the beam. Error signals for the x and y directions are passed to drivers 130 which, in turn, control position adjusters 132, such as linear motion stages, for causing movement of optical elements 114 and/or 116 as is necessary to compensate for the detected positional error. The two-wedge system appearing in FIG. 1 is described in detail below by way of reference to FIG. 5. It will be recognized that other compensating optics may be employed as well, e.g., including the passive refractive and reflective optical compensating optics described herein.

Figure 2:
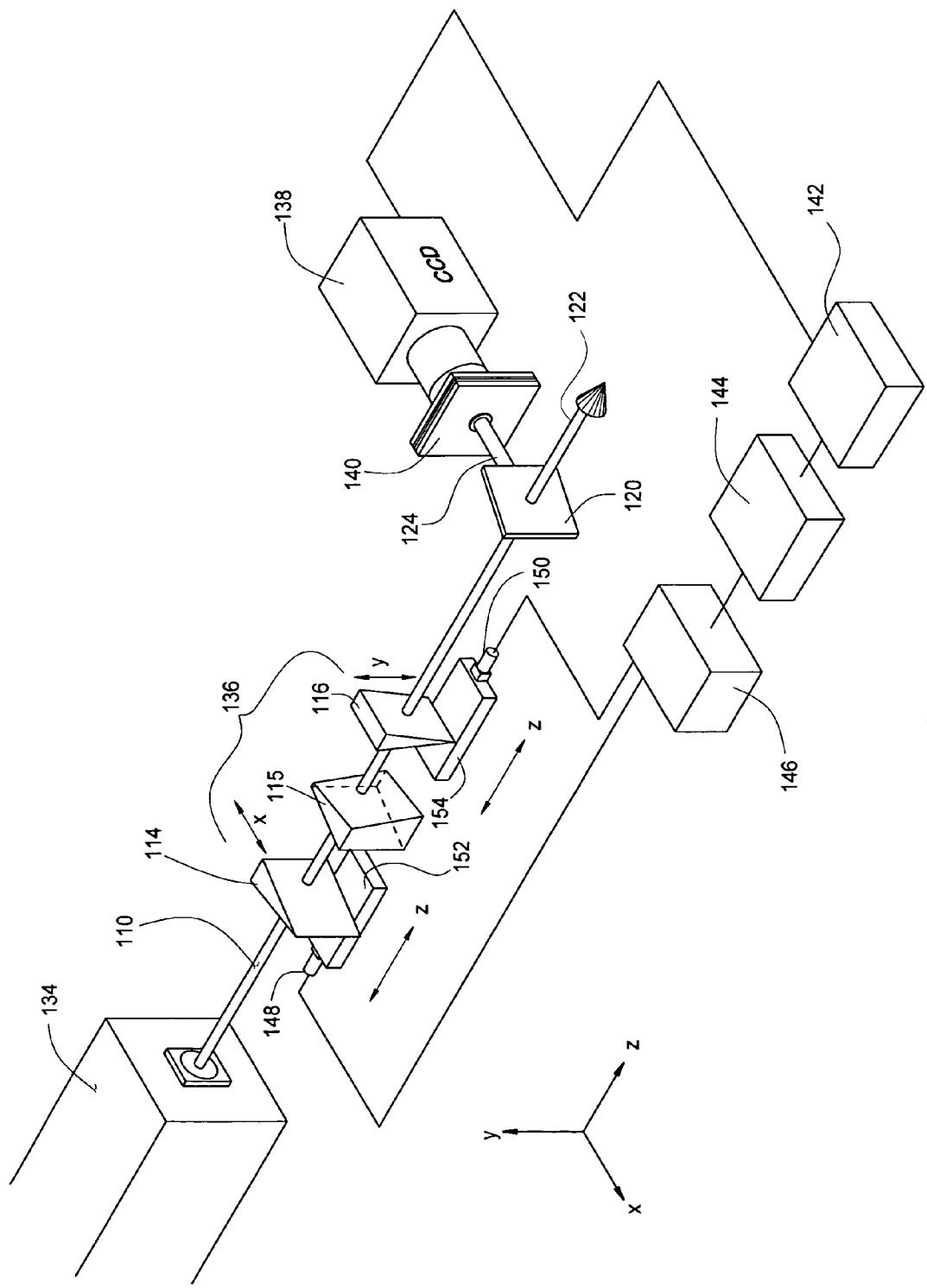
FIG. 2 is a diagrammatic illustration of beam shift compensator device in accordance with further aspects of the present invention.

Referring now to FIG. 2, there is shown a compensation system for according to a further embodiment of the present invention. A laser beam 110 generated by laser source 134 is passed through an optical wedge system 136 including a first movable wedge 114, a second, fixed-position wedge 115, and a third movable wedge 116. The beam 110 is passed to a beam splitter 120. A portion 122 of the beam is transmitted and a portion 124 is reflected.

The reflected beam portion 124 is imaged using a CCD camera 138. Optionally, a fluorescent screen 140 may be employed, e.g., where it is necessary or desired to convert the incident beam to another wavelength for detection. For example, in certain cases, the incident beam cannot be imaged or sensed directly, as when an ultraviolet laser light source 134 is utilized or wherein the laser intensity may damage the photosensor. The fluorescent glass or screen 140, such as glass plate coated with a fluorescent material, is positioned between the beam splitter 124 and the CCD camera 138 in the path of the beam 122 for generating a fluorescent output which corresponds to the position of the incident optical beam. It will be recognized that laser sources of a variety of wavelengths and/or intensities may be employed and that, in some cases, the incident beam may be imaged or sensed directly.

An interface 142 is used to couple the CCD camera to digital signal processing circuitry 144 which receives digital representations of the imaged beam. The processing electronics 144 determines the x and y directional deviations from a desired beam position based on the sensed position of the beam within the imaged field. A special-purpose digital signal processor may be employed to perform computationally intensive processing of the digital signal, although it will be recognized that digital signal processing functions may also be performed with a general-purpose central processing unit. In other embodiments, multiple processors may be used, for example, wherein computationally intensive processing may be performed using one or more dedicated digital signal processors, and with a general purpose central processing unit optionally being used for any further processing and/or storing the processed signal representations in an electronic memory or other digital storage medium. In still further embodiments, the processing functionality may be implemented in whole or in part employing a dedicated computing device, hardware logic or finite state machine, which may be realized, for example, in an application-specific integrated circuit (ASIC), programmable logic device (PLD), field programmable gate array (FPGA), or the like.

The processor 144 determines the x and y components of the positional error, e.g., based on the difference between the centroid of the imaged beam position and the desired beam position, and outputs x and y error signals to driver circuitry 146. Driver circuits 146, in turn, control linear motion actuators 148 and 150. The first wedge 114 is supported on a motion stage 152 which is movably supported on the linear actuator 148 for advancing or retracting the first wedge 114 in the z-axial direction relative to the fixed double wedge 115. The second wedge 116 is supported on a motion stage 154 which is movably supported on the linear actuator 150 for advancing or retracting the first wedge 116 in the z-axial direction relative to the fixed double wedge 115.

Figure 3:
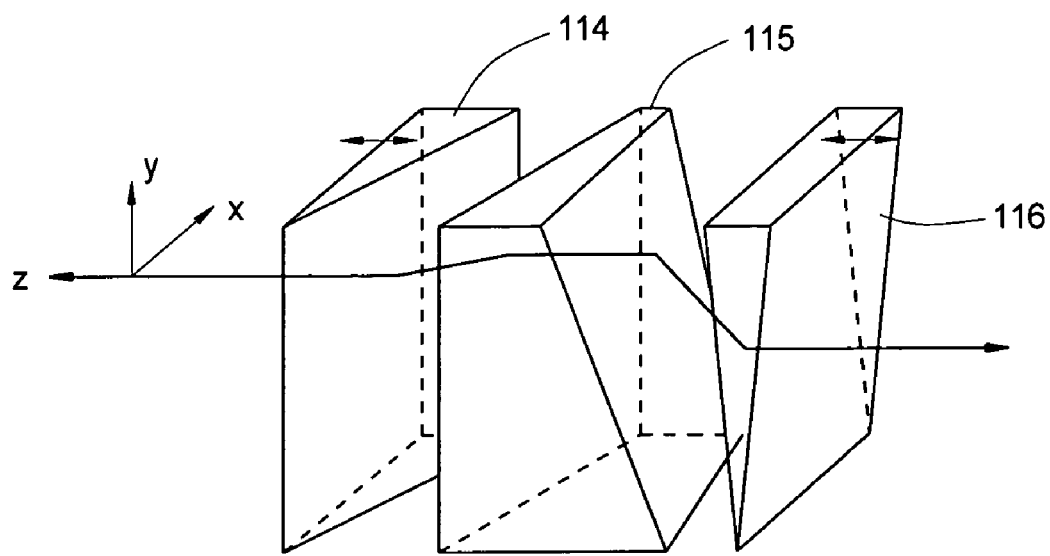
FIG. 3 illustrates a three element wedge system according to the present invention.
Figure 4:
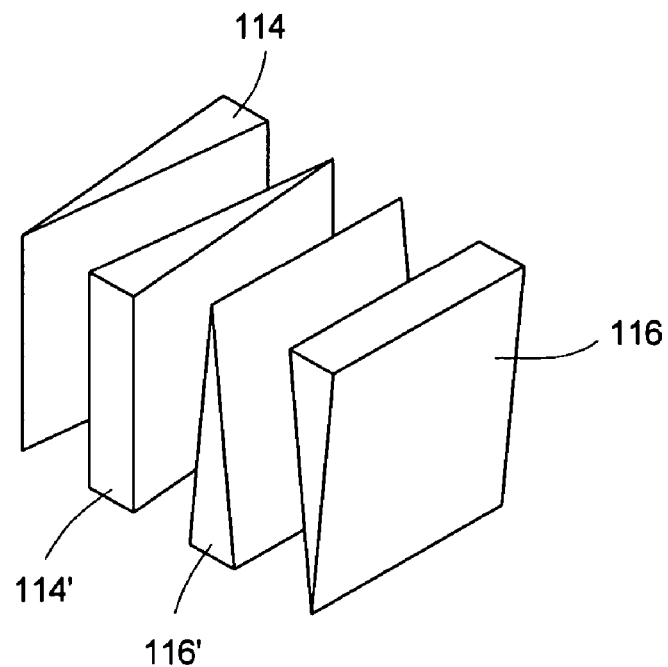
FIG. 4 illustrates a four element wedge system according to the present invention.

As best seen in FIG. 3, the first wedge 114 is tapered in the x-direction, thereby causing refractive deflection of the beam in the x-z plane. The second wedge 116 is tapered in the y-direction, thereby causing a change of direction of the beam in the y-z plane. The fixed-position double wedge 115 has a first, light receiving face which is aligned with the opposing face of the wedge 114. The fixed-position double wedge 115 also has a second face opposite the first face which is aligned with the opposing face of the wedge 116. It will be recognized that the double wedge 115 could be replaced with a pair of wedges 114' and 116', which are complimentary to the first and second wedges 114 and 116, respectively, as shown in FIG. 4.

In operation, the beam is deflected away from the z-axis, in the x-direction by the wedge 114. The light receiving surface of the double wedge 115 refracts the beam so that it returns to a path generally parallel to the z-axis, but displaced therefrom in the x-direction, the distance between the wedge 114 and the double wedge 115 determining the magnitude of the displacement of the beam in the x-direction. As the beam 122 exits the double wedge 115, the beam is refracted away from the z-axis, in the y-direction. The light receiving surface of the second wedge 116 refracts the beam so that it returns to a path generally parallel to the z-axis, but displaced therefrom in the y-direction, the distance between the double wedge 115 and the wedge 116 determining the magnitude of the displacement of the beam in the y-direction.

Figure 5:
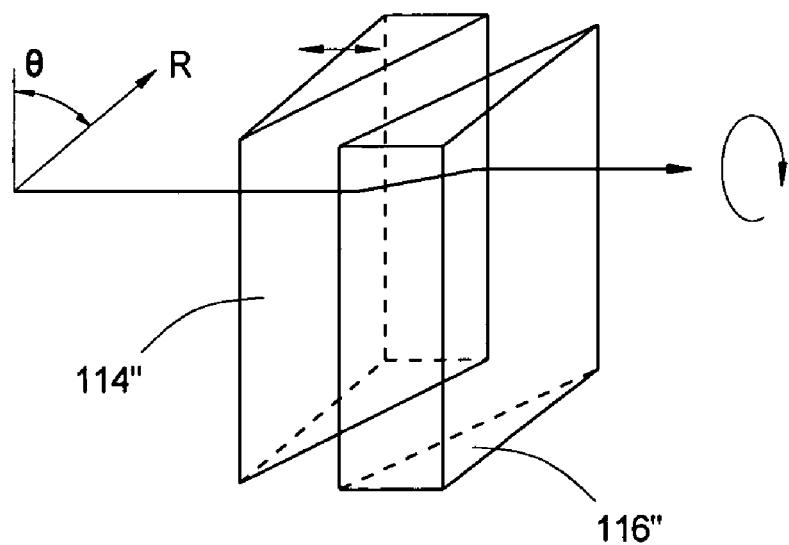
FIG. 5 illustrates a two element wedge system according to an alternative embodiment of the present invention.

Alternatively, the three-element beam wedge system as depicted in FIG. 2 may be replaced with a two element wedge system as shown in FIG. 5. The position of the beam may be detected as described above, and the positional error is calculated or converted to polar coordinates wherein displacement between the detected beam position and the desired position is defined by a magnitude or radial shift component and an angular shift component. In operation, the beam is deflected away from the z-axis, in the x-direction by the first wedge 114". The second wedge 116" refracts the beam so that it returns to a path generally parallel to the z-axis, but displaced therefrom in the x-direction. The distance between the wedge 114" and the wedge 116" is adjusted so that the magnitude of the displacement of the beam in the x-direction corresponds to the radial shift. Both wedges are then rotated by an angle, v, corresponding to the angular shift.

Figure 6:
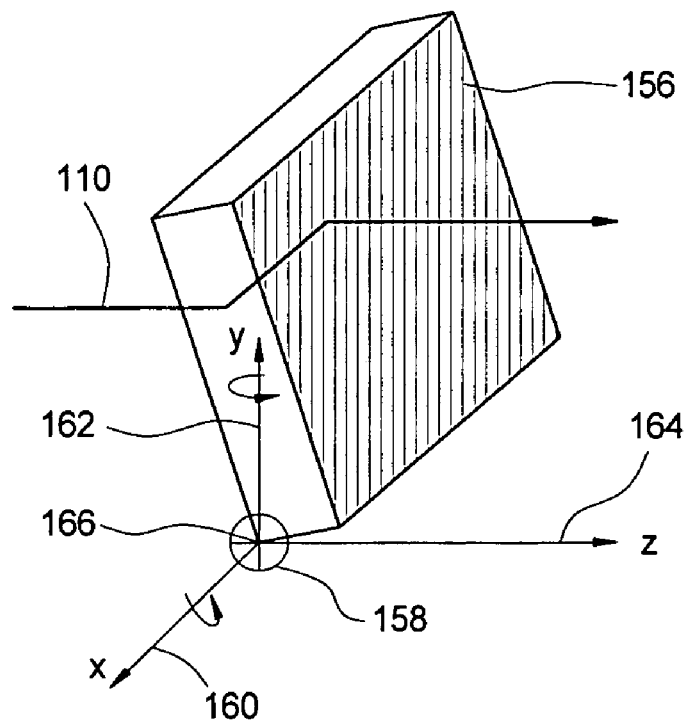
FIG. 6 illustrates a beam shift compensator employing a single, flat parallel plate.

In yet another alternative embodiment, the wedge system of FIGS. 2 and 5 may be replaced with a single optical element 156 as shown in FIG. 6. The optical element 156 is a flat parallel plate or piano lens, such as a flat quartz plate, bulk cylindrical optic, etc., and is mounted to a gimbal support or platform 158 configured to rotate independently about both the x and y axes 160 and 162, respectively. The axes 160 and 162 are mutually orthogonal to the z-axial direction 164. In the depicted embodiment, the plate 156 may be rotated independently about either or both of the axes 160 and 162 relative to a fixed point 166. The x and y positional error signals are used to control the degree of rotation about each of the axes 160 and 162 so as to compensate for the deviation of the incident beam relative to a desired beam path. The beam 122 is shifted along the x axis 160 by rotation of the plate 156 about the y axis 164. The beam 122 is shifted in the y direction by rotation of the plate 156 about the x axis 160. Alternatively, a kinematic plate having at least two degrees of freedom (see, e.g., FIGS. 12-14) may be employed in place of the gimbaled support 158.

Figure 7:
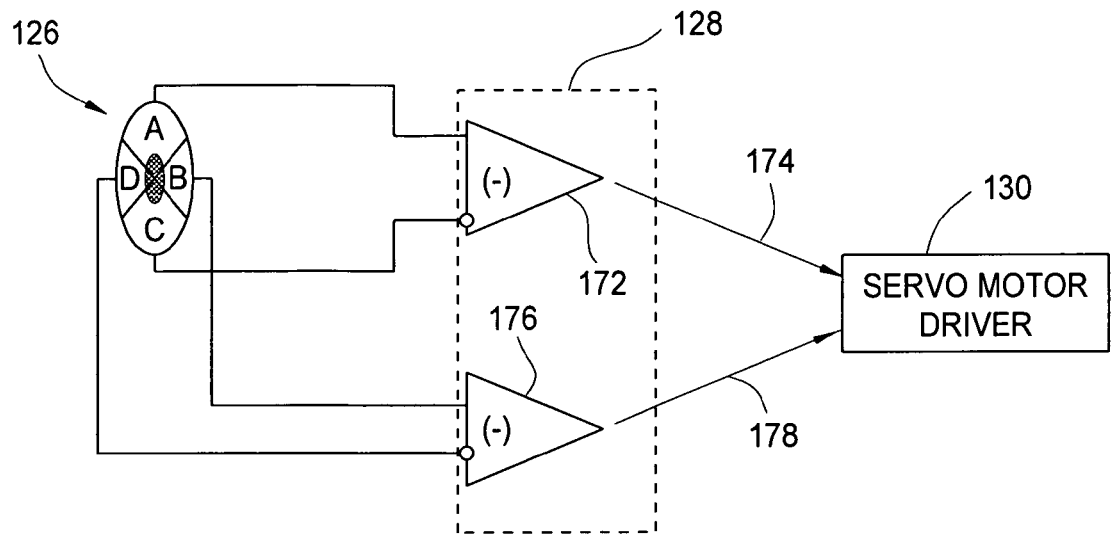
FIG. 7 illustrates a beam-centering system which is suitable for use with the present invention using a four-quadrant split photo receiver.

The positional offset between the detected beam position and the desired beam position may be determined by a number of methods. Referring now to FIG. 7, there appears a quadrant photo receiver-based system including a four-quadrant split photodetector 126, which is generally known in the art. The photodetector 126 includes quadrants A, B, C and D, with the quadrants A and C aligned in the x direction and the quadrants B and D aligned in the y direction. The system may be calibrated such that the incident beam 124 is centrally located on the detector 126, and thus, light intensity detected by each of the quadrants is the substantially the same, when the laser beam 122 is in the desired position.

Figure 8:
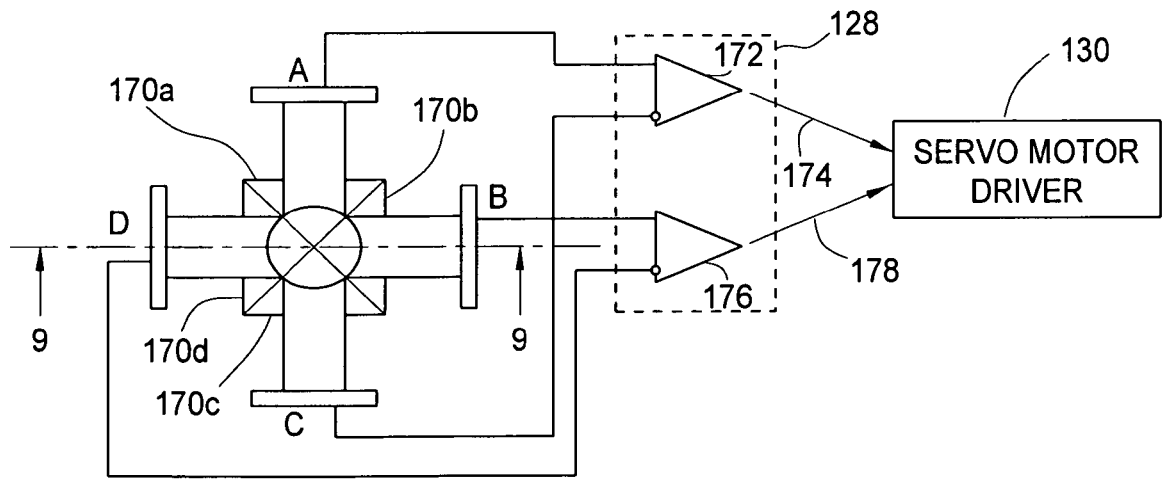
FIG. 8 illustrates a beam centering system which is suitable for use with the present invention employing a square pyramid with four mirror faces and four aligned photo sensors.
Figure 9:
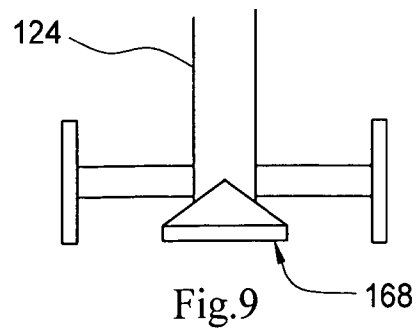
FIG. 9 is a side view of the beam centering system viewed along the lines 9-9 in FIG. 8.

In an alternative detector configuration, as shown in FIGS. 8 and 9, the beam 124 is directed toward the vertex of a square pyramid 168 having four mirror faces 170a, 170b, 170c, and 170d. Four photosensors A, B, C, and D are radially spaced about the pyramid 168, each being in optical alignment with a respective one of the faces 170a-170d. When the incident beam 124 is centered on the vertex of the pyramid 168 the light reflected by each of the faces onto its respective photosensor is substantially the same.

Irrespective of whether the sensor employed is the quadrant photosensor of FIG. 7 or the pyramid sensor of FIGS. 8 and 9, the detectors A-D generate electrical signals indicative of the intensity of detected light, which signals are passed to the x-y error signal recovery circuit 128 to determine variations between the light intensity, e.g., as a result of laser beam drift. The output of the photosensors A and C are passed to a first comparator circuit 172, which generates an error signal 174 for the y-direction proportional to the difference between the light intensity impinging on the quadrants A and C. The output of the quadrants B and D are passed to a second comparator circuit 176, which generates an error signal 178 for the x-direction proportional to the difference between the light intensity impinging on the quadrants B and D. The output signals 174 and 178 are passed to the servo control 130 and the compensating optics are adjusted as detailed above until substantially equal light intensity is sensed by each of the detector quadrants, indicating that the effect of the laser beam drift has been cancelled out and the beam has returned to the desired position.

In yet another embodiment, a duolateral position-sensing module may be employed to sense beam position. The duolateral position sensor employs a position-sensing photodiode which outputs the voltage analogs of the x and y position on the sensing surface which may, in turn, be used to adjust the compensation optics 136 to return the position of the beam to the desired position. An exemplary duolateral position sensing module that may be employed with the present invention is the DL100-7PCBA3, which is available from Pacific Silicon Sensor Inc. of Westlake Village, Calif.

Figure 10:
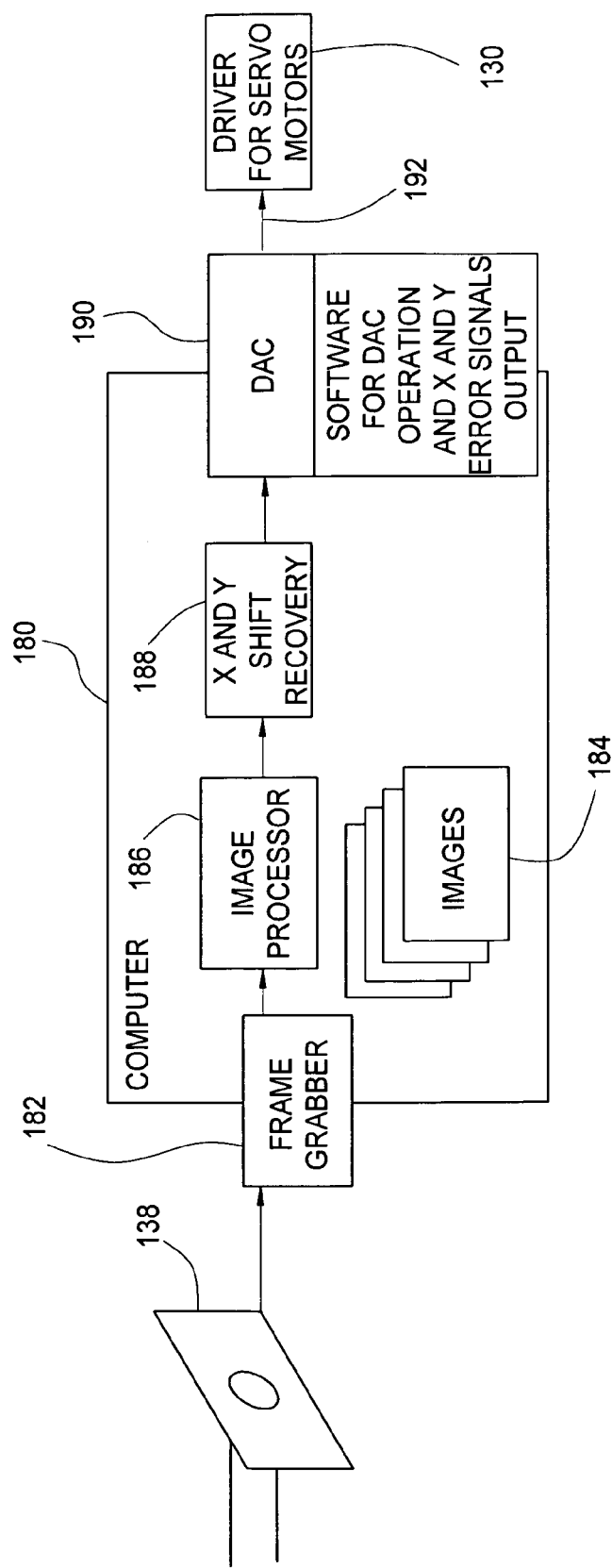
FIG. 10 illustrates yet another beam-centering system which is suitable for use with the present invention employing photo-imaging system in conjunction with a computer-based information handling system.

Referring now to FIG. 10, there appears yet another embodiment employing a photoimager-based position sensor 138, which may be, for example, a CCD camera, CMOS digital detector array, or the like. The imager 138 outputs a two-dimensional image of the incident light (e.g., the beam 124 or the fluorescent output of the fluorescent glass 140, see FIG. 1) and passes it to a computer-based information handling system 180.

Optionally, a frame grabber 182 may be employed to receive a video signal and convert the current video frame into a digital image representation which may be stored in a memory 184 of the computer system 180. Alternatively, the imager 126 may pass the acquired image as digital data directly to the computer system 180 for storage in the memory 184.

An image processing module 186, based on the two-dimensional image, calculates the position of the incident beam in the imaged field, e.g., by determining the centroid of the incident beam based on the image pixel values. A shift recovery processing module 188 calculates x and y shift recovery values based on the difference between the detected beam position and the desired beam position. This may include comparing the detected beam position with previously stored data or data stored in a lookup table. A digital-to-analog converter and associated control logic 190 may be provided to convert the x and y recovery values into an analog control signal 192 which is passed to drivers 130 for servo motors or the like controlling the position of the optical compensator 136. Alternatively, the motor control signal 192 may be output as a digital motor control signal. Thus, any drift in beam position from the desired position is detected as movement or a change of position of the beam within the imaged field. The motor control signal information is fed to the controller 130, which includes electronic circuitry capable of controlling the position of the movable optical elements in the optical compensator 136. As used herein, the term "processing module" is intended to refer to a functional module which may be implemented in hardware, software, firmware, or combinations thereof. Furthermore, it is to be appreciated that any or all of the processing modules 184, 186, 188, and 190 may employ dedicated processing circuitry or, may be employed as software or firmware sharing common hardware.

Figure 11:
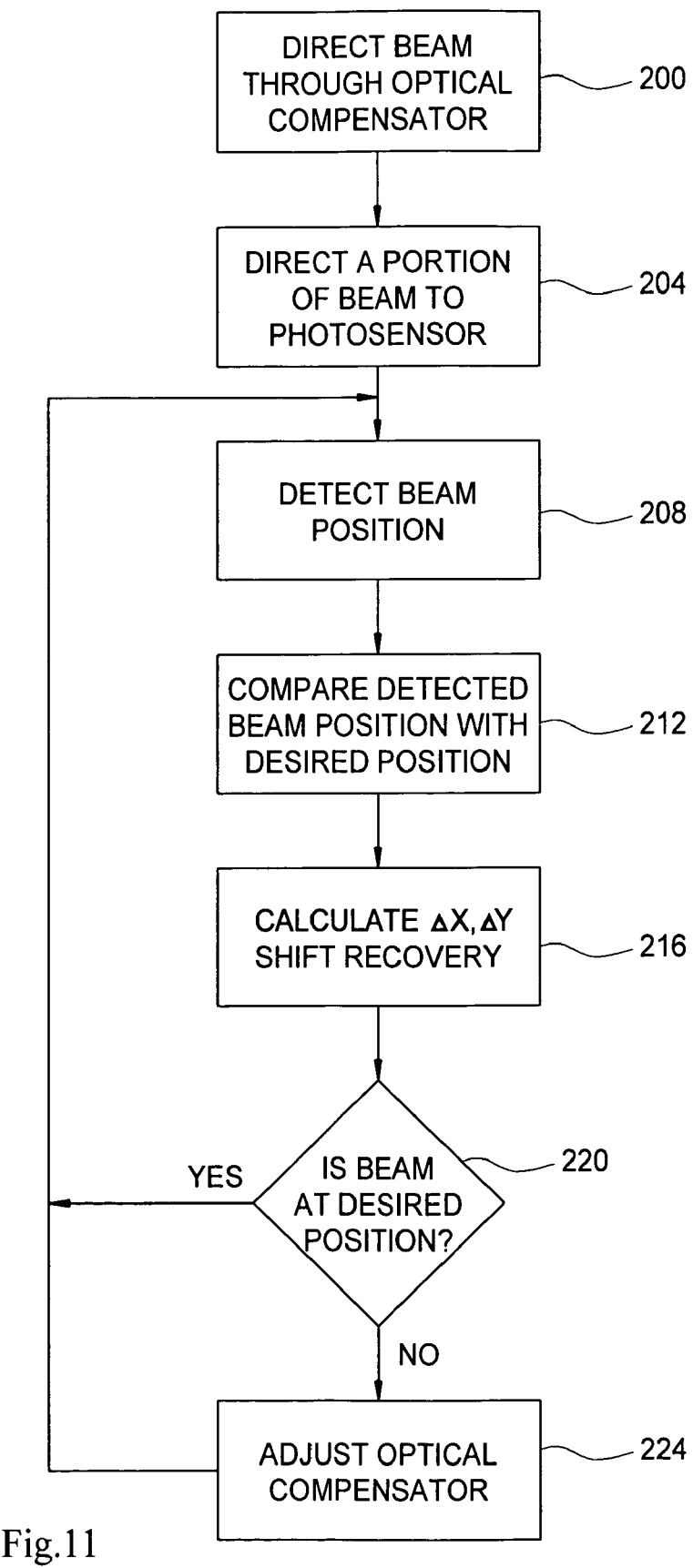
FIG. 11 is a flowchart illustrating a method in accordance with the present invention.

Referring now to FIG. 11, a flow diagram depicting a method for adjusting the laser beam position, i.e., to compensate for laser beam shift or drift, is shown. The method comprises generating a laser beam and directing the beam through an optical compensator in accordance with this teaching (step 200), toward a beam splitter, such as a partially reflective mirror, optical sampler, etc. A portion of the beam is directed to a photosensor or photoimager as described above, and the remainder of the beam is passed on to the target to be processed or illuminated (step 204).

The two-dimensional position of the sensed light beam portion on the photosensor is detected (step 208). The detected two-dimensional position of the reflected light beam on the sensor is then compared with a desired position of the beam (step 212). The two-dimensional position of the light beam position may be detected and compared with a desired position by a number of methods, such as those detailed above.

Based on the difference between the detected position of the beam and the desired position of the beam, the x and y components (or, alternatively, angular and magnitude polar coordinate components) of the beam shift necessary to position the beam at the desired position are determined (step 216). A determination is made as to whether the beam is at the desired position (step 220). If it is determined that the beam is correctly positioned, the process returns to step 208 and continues as described above. If it is determined that the beam is not at the desired position at step 220, the position of the optical compensator is adjusted (step 224) to compensate for the x and y offset amounts and the process returns to step 208 and continues until beam is at the desired position. The method of FIG. 11 may be employed to properly position the beam as well as to monitor the beam position and maintain correct positioning by making subsequent corrections in the event that the beam position subsequently drifts or is otherwise shifted. For example, the process may be repeated, e.g., continuously or at predetermined time intervals to monitor and maintain the desired beam position.

Figure 12:
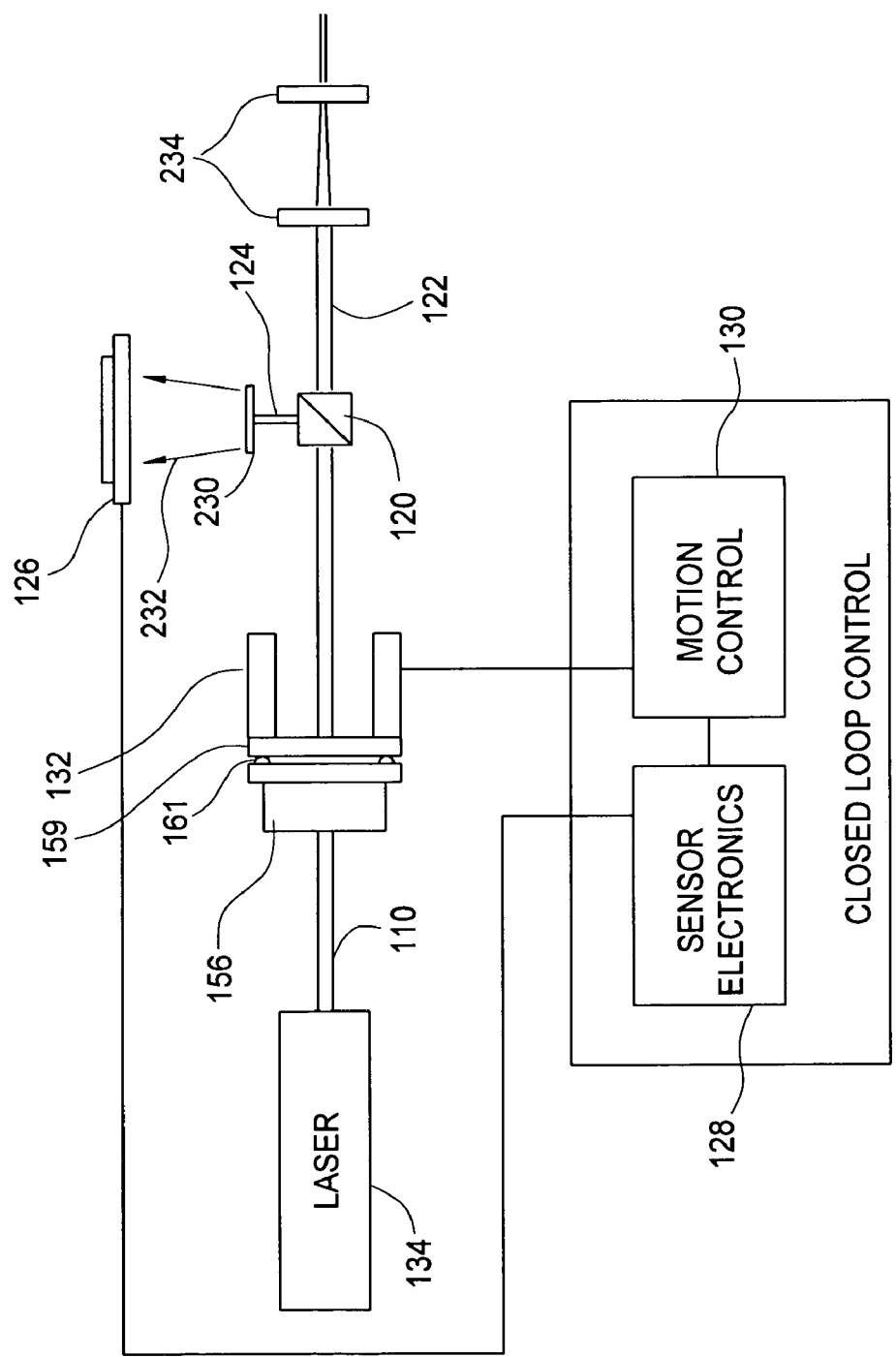
FIGS. 12 and 13 depict still further embodiments of the present invention employing a beam splitter and a diffractive optical element for shaping the portion of the beam delivered to the beam position sensor.

Referring now to FIG. 12, there appears a further embodiment beam stabilizing system employing a diffractive optical element 230 for modifying the characteristics of the laser beam portion 124 delivered to a position sensor array 126. The laser beam 110 is delivered by laser source 134 to beam drift compensating optics 156, which may be an optical plate or optical wedge system, as detailed above. In the depicted FIG. 12 embodiment, there is illustrated an alternative means of controlling passive beam steering optics employing a parallel plate optical element mounted to a kinematic plate 159. The kinematic plate 159 includes a plurality of adjustment screws or the like 161 which are controlled by servo actuators 132 which, in turn, are controlled by control circuit 130. The kinematic plate provides two degrees of freedom to effect rotation independently about the x and y axes. Alternatively, a wedge system or gimbaled plate as detailed above or reflective compensating optics as detailed below may be employed.

The laser beam 110 then passes to a beam splitter 120, which transmits a portion 122 of the incident beam 110 and reflects a portion 124 to the diffractive optical element (DOE) 230. Preferably, the DOE 230 is implemented as a holographic optical element, including but not limited to computer-generated holographic optical elements, although other diffractive optical elements are also contemplated. Although a single DOE is depicted, it will be recognized that complex diffractive optical systems comprising multiple diffractive optical elements may also be employed. The modified laser beam 232 output from the DOE 230 is passed to position a position-sensing photosensor or photo imager 126.

The DOE 230 is selected to modify the size and shape of the beam portion 124 to tailor the light to a selected position sensor array 126. The illumination field output by the DOE 230 can be a specialized shape produced at a specified working distance away from the HOE 230. With specific reference to FIGS. 13 and 14, and continued reference to FIG. 12, there appears an exemplary photo sensor array 126 comprising four linear or one-dimensional position sensitive detectors 236, extending radially with respect to the beam 124 and spaced ninety degrees apart. The sensors may be as described in commonly owned provisional patent application Ser. No. 60/629,941, filed Nov. 22, 2004, which is incorporated herein by reference in its entirety.

The position sensitive detectors 236 typically provide measurements in increments ranging from about 5-10 microns, thereby providing very high position measurement resolution. The detectors 236 may be linear arrays of discrete detector elements, or may be linear (one-dimensional) position sensitive detectors. One-dimensional position sensitive detectors are available, e.g., from Hamamatsu Corporation of Bridgewater, N.J.

Other numbers of linear detectors may be used. For example, in an alternative embodiment, eight linear detectors may be used, each extending radially about the beam 124 axis and spaced 45 degrees apart. Where radially extending linear detectors are employed, the modified beam shape may be a circular or rectangular ring, which may be continuous or segmented. However, it will be recognized the DOE 230 may produce other geometric shapes complimentary with the photo sensor array 126.

With continued reference to FIG. 12, the output from the sensor array 126 is passed to sensor electronics 128 for calculation of the x and y directional components of any deviation between the detected beam position and the desired beam position. Error signals for the x and y directions are passed to a controller 130 which, in turn, controls servo actuators 132 to cause movement of the optical element 156 to compensate for the detected beam position error.

The transmitted beam portion 122 may be shaped by one or more beam shapers 234 and delivered to a target object to be processed or illuminated, etc. The beam shaping optics may be, for example, Gaussian-to-flat top converting optics, or the like.

Figure 13:
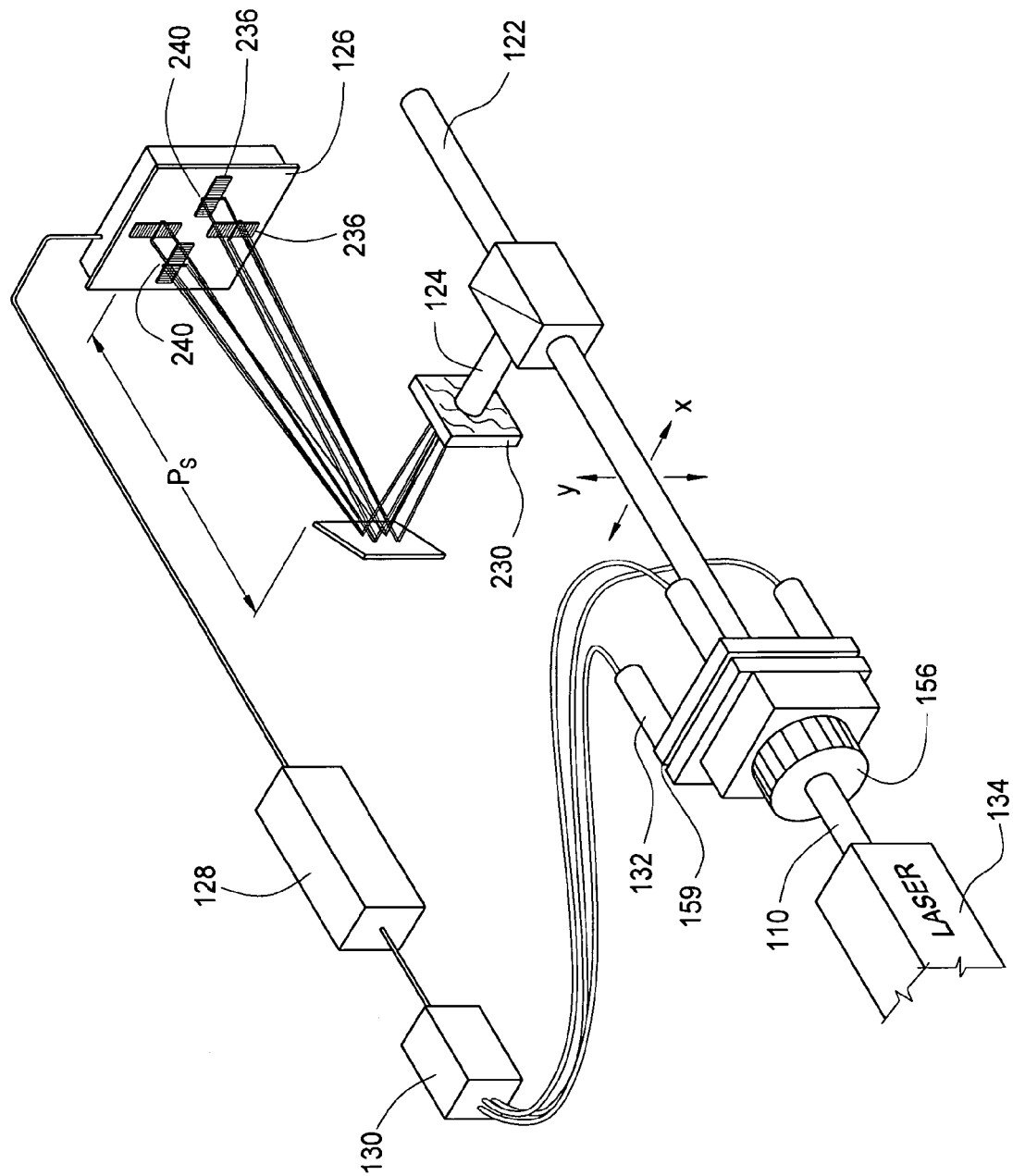
Figure 16:
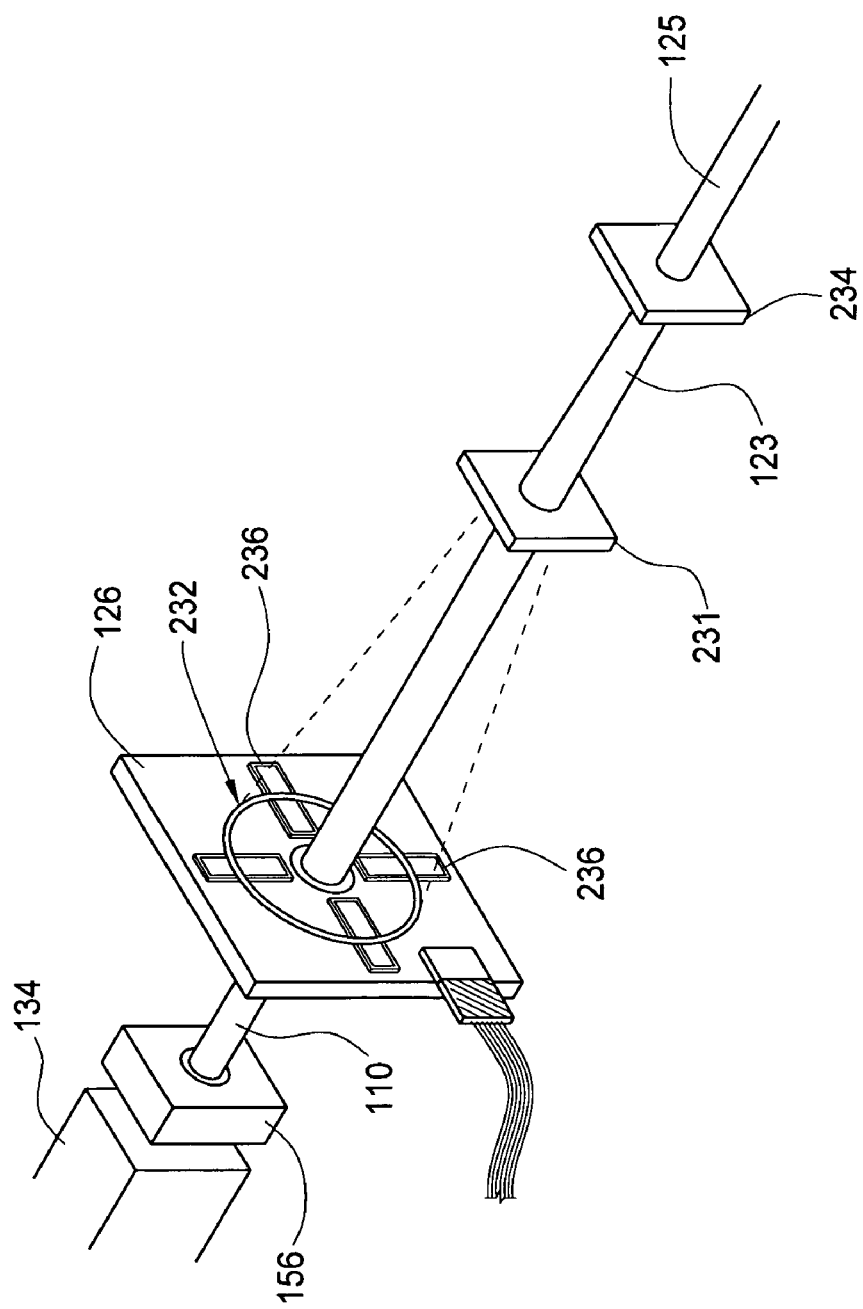
Figure 17:
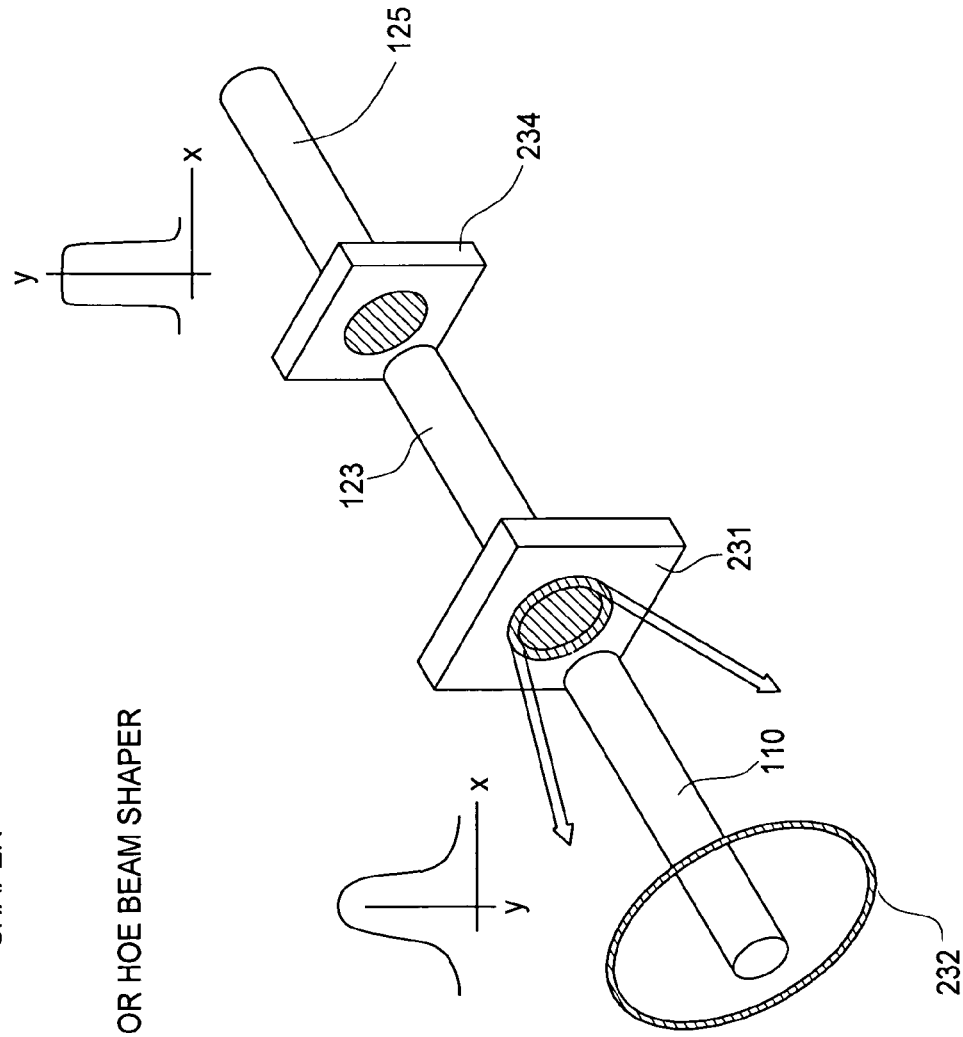
Figure 18:
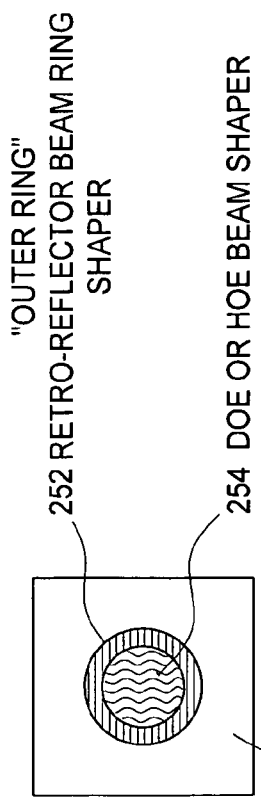

Referring now to FIG. 13, there is shown an exemplary embodiment similar to the embodiment of FIG. 12, wherein the diffractive optical element 230 produces four discrete illumination fields or segments 240. The laser beam 110 is delivered by laser source 134 to beam drift compensating optics 156, which may be an optical plate mounted on a kinematic plate 159, or alternatively, may be a refractive or reflective optical wedge system as detailed herein.

The laser beam 110 passes to a beam splitter 120, which transmits a portion 122 of the incident beam 110 and reflects a portion 124 to the diffractive optical element (DOE) 230. Again, a single DOE is depicted, although DOE systems comprising multiple diffractive optical elements are also contemplated. The modified laser beam 232 output from the DOE 230 is passed to position a position-sensing photosensor or photo imager 126.

The position sensor 126 includes four linear position sensitive detectors 236, each extending radially with respect to the beam 124 and spaced ninety degrees apart. The DOE 230 modifies the beam portion 124 to generate four discrete illumination segments 240. Alternatively, the beam segments 240 could be the sides of a continuous rectangular ring. In yet another alternative embodiment, the segments 240 may be replaced with a continuous circular ring (see FIG. 14) segmented arcs (not shown) each intersecting with a corresponding one of the linear detectors 236.

In alternative embodiments, wherein additional linear detectors are employed, a DOE generating additional corresponding segments or sides of a polygon may likewise be employed. For example, where eight radially extending and equally spaced sensors are employed, a DOE generating a continuous circular or octagonal ring is employed. Alternatively, a DOE generating eight segments or arcs could be used as well.

In operation, position sensing electronics 128 compares the positions of the segments 240 on the horizontally aligned pair of linear detectors 236 to generate beam positional offset in the x-direction and compares of the positions of the segments 240 on the vertically aligned pair of linear detectors 236 to generate beam positional offset in the y-direction. The x and y-positional offsets are output to the motor control 130 which, in turn, controls servo actuators 132 to cause movement of the optical element 156 to compensate for the detected beam position error.

The DOE 230 may be configured to generate an illumination shape or pattern of a desired size at a selected distance (Ps) from the DOE 230, wherein a greater distance Ps results in increased sensitivity.

Referring now to FIG. 14, a diffractive optical element 231 having a holographic or diffractive aperture and which outputs a retro-reflected shaped beam is employed, thereby eliminating the need for a beam splitter for directing a portion of the beam to a position sensor.

The laser beam 110 is delivered by laser source 134 to beam drift compensating optics 156, which may be an optical plate or optical wedge system, as detailed above. The laser beam 110 through a photosensor array 126 comprising a plurality of linear sensors 236 disposed about the beam 110, e.g., mounted to a circuit board or substrate 235 carrying drive electronics for the sensors 236 and having a central opening 250 therethrough. The beam 110 is passed to a DOE 231 which outputs an apertured beam portion 123 and a retro-reflected beam portion 233. The apertured portion 123 may be passed on to the target object or region for illumination, processing, etc. Alternatively, as shown in FIGS. 15-18, the DOE 231 may be a part of a complex diffractive optical system incorporating two or more diffractive optical elements. In the depicted embodiment, a complex beam shaping system includes the input DOE 231 and output DOE 234 for generating a desired output beam 125, such as a flat top beam or beam having another desired shape or intensity profile. The input DOE 231 includes an outer ring portion 252 comprising a retro-reflective beam ring shaper that reflects the laser beam overfill and an inner beam shaper portion 254 which shapes the apertured beam portion 123.

With continued reference to FIG. 14, the retro-reflected portion 233 output by the DOE 231 has a shaped illumination field 242, which is a circular ring in the depicted embodiment. The retro-reflected portion 233 may alternatively be a rectangular ring, line segments, arc segments, etc., as detailed above.

The position sensor 126 includes four linear photo sensors or sensor arrays 236, each extending radially with respect to the beam 110 and spaced ninety degrees apart. In alternative embodiments, other numbers of linear detectors may be employed. If the laser centerline changes position, the retroreflected beam portion 232 shifts as well. The position of the illumination ring along each array 240 is detected and monitored. The x- and y-components of any beam positional offset are calculated by the position sensing electronics 128. A correction signal is output to motor controller 130 which, in turn, controls servo actuators 132 to cause movement of the optical element 156 to compensate for the detected beam position error. Alternatively, other beam shifting optics as described herein may be employed.

The DOE 231 may be configured to generate an illumination shape or pattern of a desired size at a selected distance from the DOE 231, wherein a greater distance between the DOE 231 and the position sensor array 126 results in increased sensitivity.

In alternative embodiments (not shown), the apertured, retro-reflective beam shaper 231 may be replaced with a transmissive beam shaper wherein a shaped ring output portion travels coaxial with the central portion and in the direction of travel of the incident beam. In such embodiments, the position sensor array 126 is positioned downstream of the apertured beam shaper.

Figure 19:
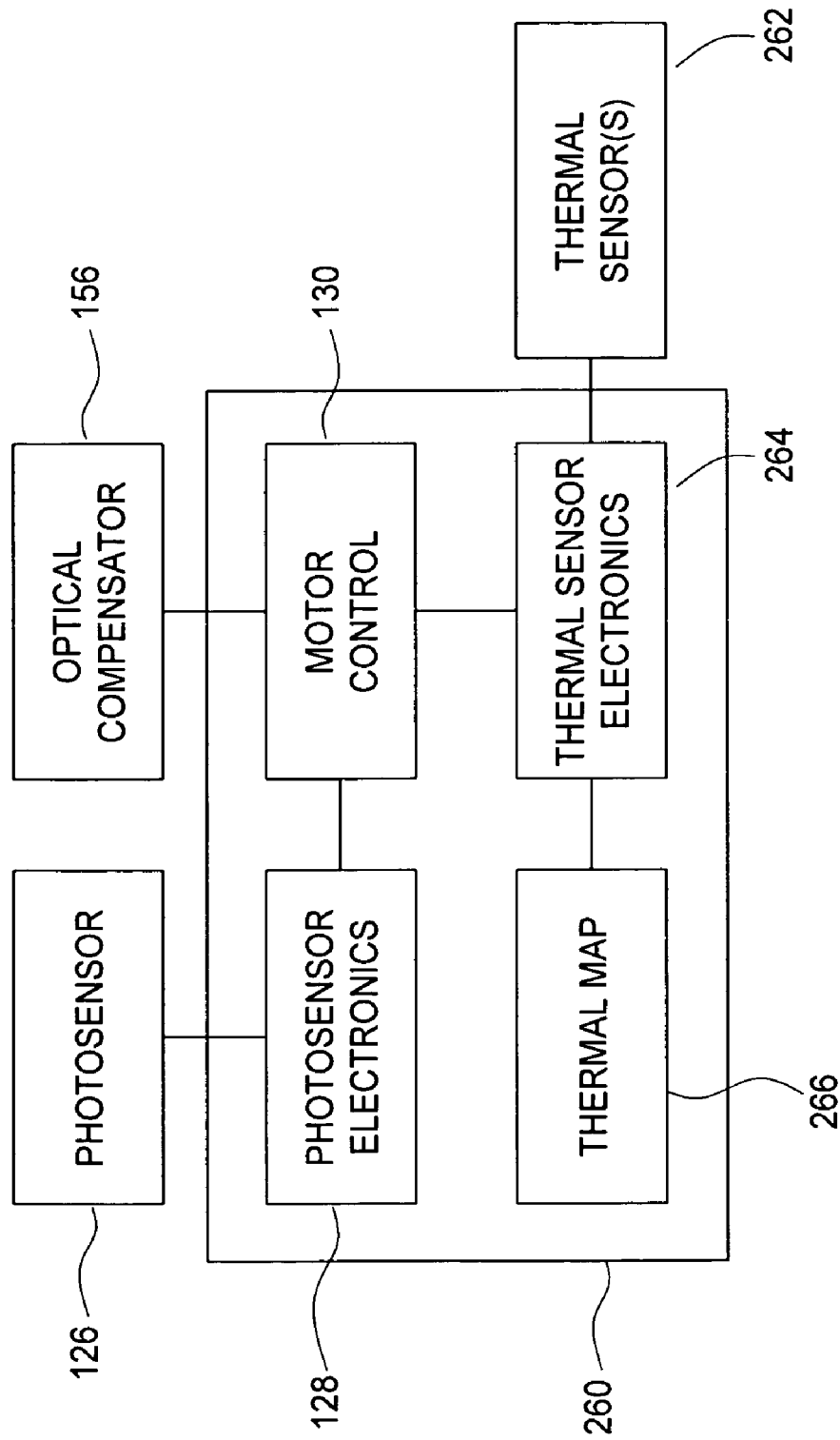
FIG. 19 depicts yet a further embodiment of the present invention which monitors thermal conditions of the laser source and adjusts the compensation optics to correct the beam position based on the sensed thermal conditions and a previously stored thermal map correlating thermal conditions and estimated or predicted beam drift.

In a further aspect of the present development, it has been found that, for certain lasers, beam drift occurs in a fairly repeatable or predictable fashion as a function of the thermal conditions of the laser. Referring now to FIG. 19, there is shown a controller 260 for adjusting compensating optics 156 based on a position sensitive photosensor 126 and one or more thermal sensors 262. The compensating optics 156 may be any of the optical compensators described herein, including a gimbaled parallel plate optics, adjustable wedge system, or reflective optics, as described herein.

The one or more thermal sensors 262 are provided to monitor thermal conditions of the laser. The thermal sensors may be provided to monitor one or more components of the laser, including but not limited to the pumping cavity, laser material, harmonic generation crystals, laser housing, ambient temperature, and so forth. The relationship between the thermal conditions monitored by the sensor(s) 262 and may be determined in advance and stored in a look up table 266 or other electronic storage device. Alternatively, the relationship between the monitored temperature and beam position may be embodied in the form of a stored equation.

Thermal sensor electronics 264 calculate an estimated beam drift based on the detected thermal conditions in accordance with the look up table or other storage device 266 and generates a signal which is passed to controller 130 which adjusts the compensation optics 156 to compensate for the estimated beam drift due to thermal conditions. The photosensor 126 and photosensing electronics 128 likewise monitor actual beam position and adjust the compensation optics 156 to maintain the beam at the desired position. The detected actual beam position may also be employed in conjunction with the sensed thermal conditions to populate or update the look up table 266. Although shown as functional blocks for conceptual simplicity, it is to be appreciated that the photosensor processing electronics 128 and thermal sensor processing electronics 264 can be implemented common hardware.

Figure 20:
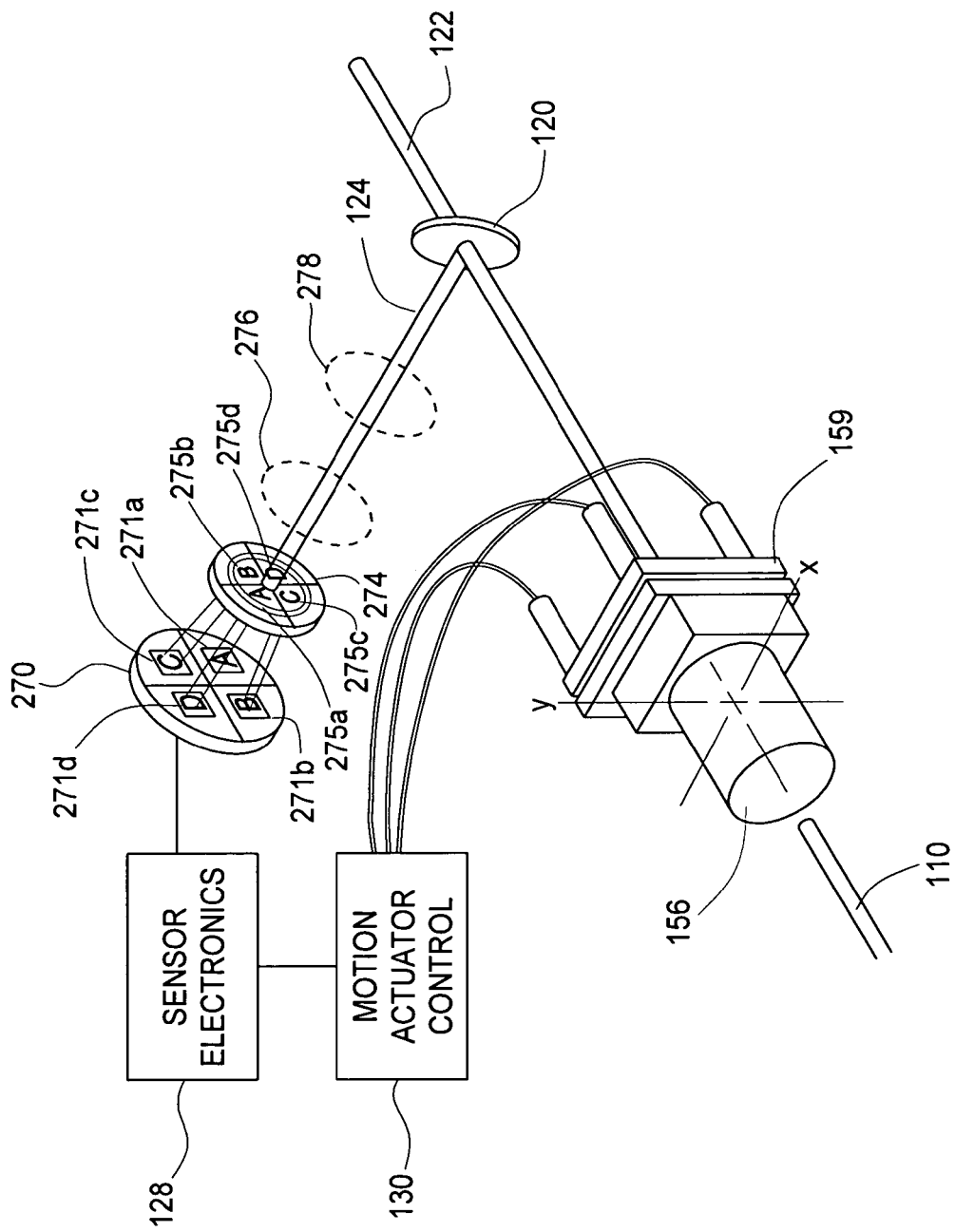
FIG. 20 illustrates another embodiment of the present invention employing parallel plate beam-steering optics and a thermopile quadrant sensor.
Figure 21:
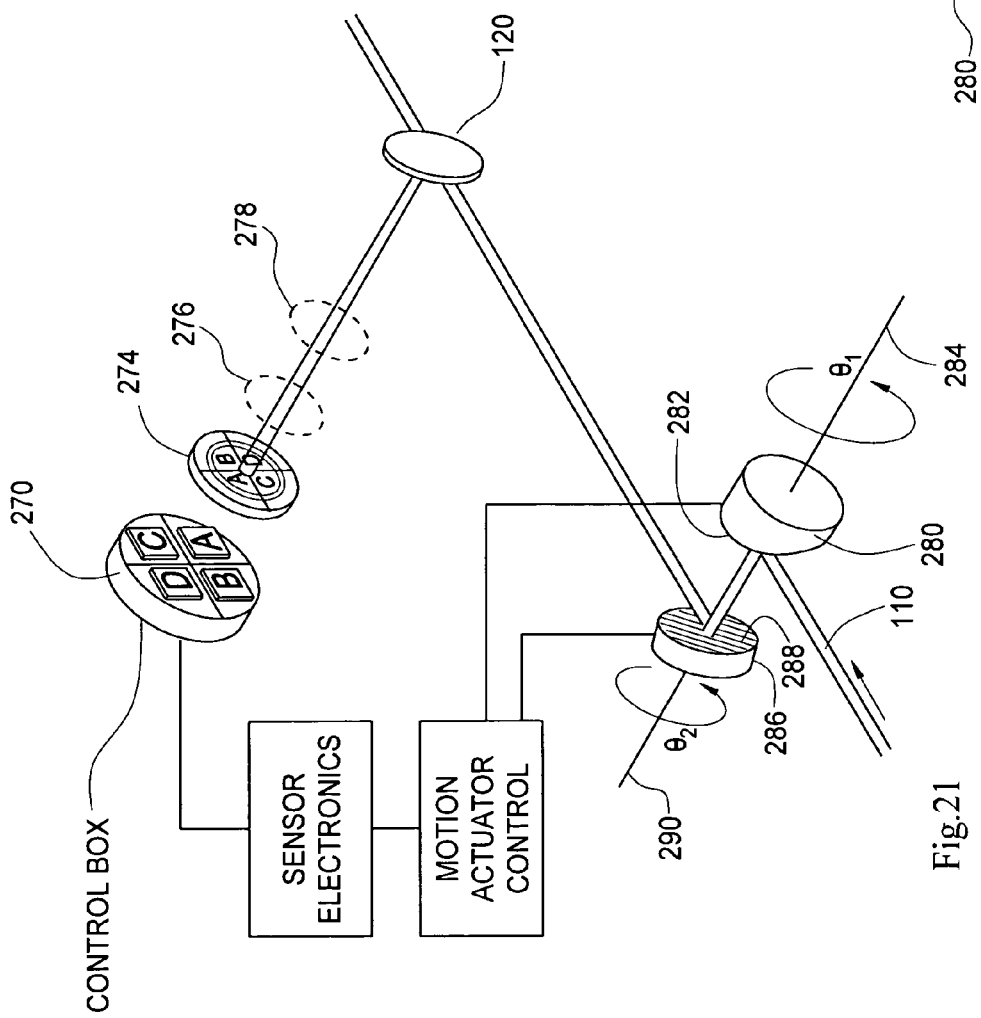
FIG. 21 illustrates yet another embodiment of the present invention utilizing a pair of reflective rotary wedges.

Referring now to FIG. 20, there appears a further embodiment beam stabilizing system employing a quadrant thermopile sensor array 270 for sensing heating effects of the incident beam. The thermopile array 270 includes four thermopile sensor quadrants 271a-d, e.g., mounted to a circuit board 272 which may additionally carry sensor drive electronics. The laser beam 110 is delivered movable beam drift compensating optics 156, which may be an optical plate or optical wedge system, as detailed above. In the depicted embodiment, a bulk cylindrical (parallel plate) optical element is shown which may be gimbaled or mounted to a kinematic plate, as detailed above. Alternatively, a refractive wedge system as detailed above by way of reference to FIGS. 3-5 or a reflective wedge system as shown in FIG. 21 may be employed.

The laser beam 110 then passes to a beam splitter 120, such as a folding beam splitter or a diffractive optical sampler, which transmits a portion (preferably a majority) 122 of the incident beam 110 and reflects a portion 124 to the thermopile sensor array 270. The thermopile sensor array 270 is preferably compensated to ambient temperature. Preferably, the beam 124 is passed to an optional DOE diffuser 278 to output a beam of uniform intensity and eliminate any hot spots in the beam power distribution that would tend to provide a false indication of beam drift. Preferably, the output of the diffuser 278 is transmitted to an optional refractive lens 276, e.g., a field lens or a condensing lens having a long working distance. Since the split portion 124 is generally a relatively small portion of the beam 110, the optional refractive lens advantageously condenses the beam so as to bring beam intensity or power density to within the sensitivity range of the thermopile array and/or to increase power density so as to improve the dynamic response and reduce noise effects of the thermopile sensor array 270.

The beam portion 124 is delivered to the vertex of a diffractive or refractive axicon 274. A square pyramidal axicon is depicted in the embodiment of FIG. 20; however, other types of axicons are contemplated, including a conical axicon (which would generate a circular ring of illumination) or axicons having other geometries. The portion of the beam 124 incident on one of the faces 275a, 275b, 275c, and 275d, is refracted so that it impinges in a diagonally opposed quadrant 271a, 271b, 271c, and 271d, respectively, of the quadrant sensor array 270. The axicon 274 is positioned such that, when the beam 110 is in the desired position, the beam portion 124 is directed to the vertex of the axicon 274 and the light impinging on, and thus the voltage output of each of the thermopile sensor quadrants is, substantially the same. If the beam drifts from the desired position path such, the split beam portion 124 will no longer be centered on the apex of the axicon 274. The sensor electronics 128 compares the output of the sensor quadrants 271a-d to determine beam positional offset, which is output to motor control 130 which controls servo actuators to cause movement of the optical element 156 so as to compensate for the detected beam position error.

Although the present development is described primarily herein by way of reference to passive, refractive beam compensating optics, it will be recognized that passive, reflective beam compensating optics may also be employed. The use of reflective optics in connection with the present invention advantageously avoids problems associated with the use of transmissive optics made of glass, quartz, zinc selenide, germanium, etc., particularly with high-power lasers, including beam distortion, degradation of the optics, and the high cost of transmissive optics.

Figure 22:
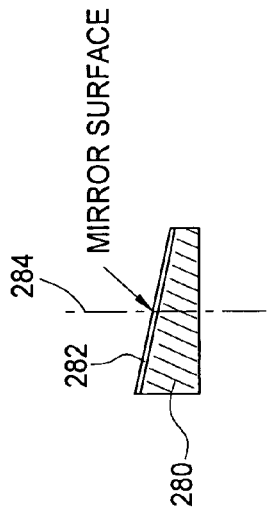
FIG. 22 is an elevational view of the rotary wedge shown in FIG. 21.

Referring now to FIGS. 21 and 22, there appears an embodiment which is similar to the embodiment of FIG. 20, but wherein reflective compensating optics are employed. An incident laser beam 110 is directed to a first wedge 280 having a mirrored surface 282. The wedge 280 is rotatable about an axis 284. As best seen in FIG. 22, the reflective surface 282 is canted with respect to the axis 284. Likewise, a second wedge 286 having a mirrored surface 288 is positioned such that the mirrored surfaces 282 and 288 are in optical communication. The wedge 286 is rotatable about an axis 290 and the surface 288 is canted with respect to the 290. Since the reflective surfaces of the rotatable wedges are canted with respect to their respective rotational axes, rotation of the wedges serves to alter the angle of the reflective surfaces relative to the incident beam, thereby altering the position of the beam path.

In operation, a laser beam 110 is directed onto the first mirrored surface 282 and reflected to the second mirrored surface 288. The beam 110 is then reflected to a beam splitter, DOE sampler, etc., 120. A first portion 122 of the beam is passed on or delivered to the desired target or process. A second portion 124 of the beam 110 is directed to a position sensor and associated optics. In the depicted embodiment, the position sensor is a thermopile array as described above and the sensor optics for the beam portion 124 include an optional DOE diffuser 278, an optional refractive lens 276, and an axicon 274 as described above by way of reference to FIG. 20. However, it will be recognized that any of the other photosensing detector arrangements and associated optics as described herein may alternatively be employed.

The sensor electronics 128 compares the output of the sensor quadrants 271a-d to determine the beam positional offset, which is output to motor control 130 which rotates the first and second wedges 280 and 286 by angles $\theta_1$ and $\theta_2$ to compensate for any beam drift and shift the beam path to the desired position.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus for maintaining a desired position of a laser beam comprising:
   an optical system including first, second, and third prismatic wedges positioned in a path of said beam in spaced-apart relation, the position of said beam being responsive to movement of one or both of said first and second prismatic wedges;
   said first prismatic wedge movable along the beam path and having a first, light receiving face and a second face opposite the first face, said first face disposed transverse to the beam path and the first prismatic wedge being tapered in a first direction perpendicular to the beam path;
   said second prismatic wedge movable along the beam path and having a first, light receiving face and a second face opposite the first face, said second wedge second face disposed transverse to the beam path path and the second prismatic wedge being tapered in a second direction perpendicular to the beam path and said first direction;
   said third prismatic wedge disposed between the first and second wedges and having a first, light receiving face and a second face opposite the first face, wherein the third wedge first face is facing and aligned with the first wedge second face and wherein the third wedge second face is facing and aligned with the second wedge first face;
   detector means for detecting an actual position of the beam;
   comparison means for comparing the actual position of the beam with the desired position of the beam and generating an error signal representative of the difference between the detected actual position of the beam and the desired position of the beam;
   means for moving said first and second prismatic wedges, whereby the optical path of the beam is altered responsive to said moving; and
   a position controller responsive to the error signal received from the comparison means and for generating an output signal to said means for moving at least one of said first and second prismatic wedges so that the beam is shifted to the desired beam position.

2. The apparatus of claim 1, wherein said detector means includes a detector selected from the group consisting of a photosensor array, a quadrant photodetector, a pyramid having mirrored faces and a photodetector in optical alignment with each of said mirrored faces, a duolateral position sensing photodetector, a CCD camera, a CMOS camera, an array of one-dimensional position sensitive detectors, an array of linear photo detectors, and a thermopile array.

3. The apparatus of claim 1, further comprising a beam splitter for directing a portion of said beam to said detector means.

4. The apparatus of claim 3, further comprising a diffractive optical element for shaping the portion of the beam directed to said detector means.

5. The apparatus of claim 1, further comprising a beam shaper shaping a portion of said beam directed to said detector means.

6. The apparatus of claim 5, wherein said beam shaper is a diffractive optical element.

7. The apparatus of claim 6, wherein said diffractive optical element comprises a reflective portion for reflecting and shaping said beam portion directed to said detector means.

8. The apparatus of claim 7, wherein the reflected, shaped beam portion is selected from a continuous ring and a segmented ring.

9. The apparatus of claim 8, wherein said continuous ring is selected from a continuous circle and continuous rectangle and said segmented ring is selected from a segmented circle and a segmented rectangle.

10. The apparatus of claim 5, wherein said detector means comprises a photodetector array selected from an array of one-dimensional position sensitive detectors and an array of linear photodetector arrays.

11. The apparatus of claim 10, wherein the linear position sensitive detectors are spaced and extend radially about an axis of said shaped beam portion.

12. The apparatus of claim 11, wherein the shaped beam portion and the incident beam are coaxial.

13. The apparatus of claim 5, wherein the beam shaper is a complex diffractive optical system comprising an input diffractive optical element for directing a portion of said beam to a position sensor and an output diffractive optical element for outputting a beam having one or both of a preselected shape and a preselected intensity profile.

14. The apparatus of claim 1, wherein the comparison means includes comparison circuitry selected from the group consisting of a comparator circuit and image processing circuitry for calculating the difference between a digital image representation of detected beam position and the desired beam position.

15. The apparatus of claim 1, further comprising a laser light source for generating said beam.

16. An apparatus for maintaining a desired position of a laser beam comprising:
    a laser light source for generating said beam;
    an optical system including one or more passive optical elements movably positioned in a path of said beam, the position of said beam being responsive to movement of at least one of said passive optical elements;
    detector means for detecting an actual position of the beam;
    comparison means for comparing the actual position of the beam with the desired position of the beam and generating an error signal representative of the difference between the detected actual position of the beam and the desired position of the beam;
    means for moving at least one of said one or more movable passive optical elements, whereby the optical path of the beam is altered responsive to said moving;
    a position controller responsive to the error signal received from the comparison means and for generating an output signal to said means for moving at least one of said one or more movable passive optical elements so that the beam is shifted to the desired beam position;
    one or more thermal sensors for sensing one or more thermal conditions of said laser source;
    a thermal map which correlates said sensed thermal conditions with an estimated beam drift;
    a control circuit for generating a thermal drift compensation signal representative of said estimated beam drift based on said sensed thermal conditions and said thermal map; and
    said position controller outputting a signal to said means for moving at least one of said one or more movable passive optical elements so that the beam is shifted by an amount which compensates for said estimated beam drift, said position controller output signal responsive to said thermal drift compensation signal.

17. A method for compensating for laser beam drift, comprising:
    directing a laser beam to a beam shifter comprising first, second, and third prismatic wedges positioned in the beam path in spaced-apart relation, wherein said first and second prismatic wedges are movable such that the position of said beam is responsive to movement of one or both of said first and second prismatic wedges;
    said first prismatic wedge movable along the beam path and having a first, light receiving face and a second face opposite the first face, said first face disposed transverse to the beam path and the first prismatic wedge being tapered in a first direction perpendicular to the beam path;
    said second prismatic wedge movable along the beam path and having a first, light receiving face and a second face opposite the first face, said second wedge second face disposed transverse to the beam path and the second prismatic wedge being tapered in a second direction perpendicular to the beam path and said first direction;
    said third prismatic wedge disposed between the first and second wedges and having a first, light receiving face and a second face opposite the first face, wherein the third wedge first face is facing and aligned with the first wedge second face and wherein the third wedge second face is facing and aligned with the second wedge first face;
    detecting an actual position of said beam;
    comparing the actual position of said beam with a desired beam position; and
    if the detected actual position is not the desired beam position, moving one or both of the first and second prismatic wedges until the beam attains the desired beam position.

18. The method of claim 17, further including:
    determining a deviation between the actual beam position and the desired beam position, said deviation including a first error component representative of an extent of said deviation in said first direction and a second error component representative of an extent of said deviation in said second direction;
    compensating for the first error component by moving the first prismatic wedge along the beam path; and compensating for the second error component by moving said second prismatic wedge along the beam path.

19. The method of claim 17, wherein said detecting step includes:

positioning a beam splitter along the beam path to direct a portion of said beam to a position-sensitive device.

20. The method of claim 19, wherein said position sensitive device is selected from the group consisting of a photosensor array, a quadrant photodetector, a pyramid having mirrored faces and a photodetector in optical alignment with each of said mirrored faces, a duolateral position sensing photodetector, a COD camera, a CMOS camera, an array of one-dimensional position sensitive detectors, an array of linear photo detectors, and a thermopile array.

21. The method of claim 17, wherein said detecting step includes:

positioning an apertured beam shaper along the beam path, said apertured beam shaper configured to pass a first portion of the beam through said aperture and to direct a second portion of the beam to a position-sensitive device.

22. The method of claim 21, wherein said second beam portion is shaped ring which is coaxial with the first beam portion.

23. The method of claim 22, wherein said shaped ring is reflected to travel in a direction opposite the direction of travel of the incident beam.

* * * * *